2,706,714

METHOD OF INHIBITING CORROSION OF METALS

William B. Hughes, Bartlesville, and Richard E. Lembcke, Tallant, Okla., assignors to Cities Service Research and Development Company, New York, N. Y., a corporation of New Jersey No Drawing. Application June 13, 1952,
Serial No. 293,455

7 Claims. (Cl. 252—8.55)

This invention relates to inhibiting corrosion of metals, and more particularly to an improved composition and process for the prevention of corrosion in natural gas collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

We have now discovered that corrosion of the type described above may be substantially inhibited by introducing into the lines a small but sufficient quantity of the reaction product of two mols of acetone and one mol of quinoline. Quinoline itself is also effective to reduce corrosion, but is not nearly as effective as the quinoline-acetone reaction compound, tests having shown that the corrosion of metal surfaces protected with the latter compound is only of the order of one fifth of that occurring when the surfaces are protected with quinoline.

It is realized that quinoline has heretofore been suggested as a corrosion inhibitor to prevent the corrosion of metal parts subjected to the corrosive action of hydrogen sulfide, for instance, in U. S. Patent 2,472,400 to Bond. This type of corrosion is, however, considerably different from that encountered in gas lines, in which little or no hydrogen sulfide is present, and it is not believed that the knowledge that quinoline is effective in reducing one type of corrosion would inevitably lead to the conclusion that it would also be effective in reducing the other type. In any event, however, the great superiority of the quinoline-acetone compound over quinoline could in no way be predicted in view of the prior art.

The exact structure of the quinoline-acetone product is not known, but it is believed to be a product hitherto unknown. It may be made by mixing together quinoline and acetone in a 1:2 molar ratio and heating under reflux until all free acetone has been removed from the reaction mixture, as evidenced by a rise in the temperature of the reacting mixture above the boiling point of acetone and preferably until the temperature rises to about 85° C., in order to insure completion of the reaction. During the reaction apparently some kind of intermediate reaction product is formed, since the mixture becomes viscous and lumpy, but as the reaction proceeds the lumps disappear and a homogeneous yellow syrupy product is formed, which is water-soluble. It is important that the time of heating be not so prolonged as to cause the temperature of the reaction mass to rise to 100° C., since under these conditions the product will decompose with the evolution of water. The dehydrated product is insoluble in water, and is unfit for use as an inhibitor in our process.

In order to test our new inhibitor, and to compare its effectiveness with presently commercially available inhibitors, a testing procedure was set up designed to duplicate as closely as possible in the laboratory the corrosive conditions existing in gas collection lines. In this testing procedure 800 ml. of distilled water which had been boiled to exclude as much oxygen as possible was placed in a one quart bottle and was acidified with 0.05% by weight of acetic acid. Dry Ice in excess of that required to saturate the water was then placed in the bottle, inhibitor in the amount of 50 parts per million was added, except in the case of the blank tests, and a tarred hot rolled steel test strip suspended on a glass hook from a rubber stopper was introduced. The bottle was then capped and allowed to stand for two weeks at room temperatures. At the end of this time the strip was withdrawn, cleaned in dilute hydrochloric acid, dried, and reweighed.

Results of representative tests are shown in the following table. Tests A and B were run at different times, and the slight difference in weight loss in the blank test strips is no doubt due to slight differences in the ambient temperatures during the tests. Commercial inhibitors A and B are commercial products especially recommended by the manufacturers for inhibiting corrosion in wet gas lines, and have proven in use to be the best inhibitors commercially available.

Table

TEST A

| Inhibitor | Weight loss of test strip in mg. | Percent protection |
|---|---|---|
| None | 196.5 | 0 |
| Commercial A | 100.4 | 48.9 |
| Quinoline | 45.6 | 76.8 |
| Quinoline-acetone | 9.9 | 95.0 |

TEST B

| Inhibitor | Weight loss of test strip in mg. | Percent protection |
|---|---|---|
| None | 190.3 | 0 |
| Commercial A | 97.3 | 48.9 |
| Commercial B | 75.1 | 65.8 |
| Quinoline-acetone | 8.0 | 95.3 |

It will be observed from the foregoing that the quinoline-acetone product exhibits outstanding efficiency in combatting corrosion, and cuts corrosion loss to about one-fifth of that incurred when using quinoline, and less than one ninth of that suffered when using the best of the commercial inhibitors tested.

It will be apparent that while an inhibitor concentration of 50 p. p. m. was established as a test standard for comparison purposes, more or less inhibitor may be used, depending on the corrosiveness of the aqueous phase present in the gas lines. In actual use in the field the concentration must, of course, be adjusted to the particular conditions there obtaining, provided only that the inhibitor is introduced in a small but sufficient amount to substantially inhibit corrosion. We find that excellent results are obtained by dissolving the inhibitor in an appropriate amount of water, in order to better control the amount of inhibitor used, and injecting the inhibitor solution into the gas lines as near to the well head as possible. The gas current flowing through the lines is then effective to mix the inhibitors with the corrosive fluids present, and to sweep the inhibitor throughout the system, affording protection to all metal equipment with which it comes in contact downstream of the point of injection.

Having now described our invention, what is claimed is:

1. As a new composition of matter, a compound formed by heating together two mols of acetone and one mol of quinoline at reflux temperature and discontinuing the heating when the temperature of the reaction mixture has risen to about 85° C.

2. As a new composition of matter, a compound formed by heating together two mols of acetone and one mol of quinoline under reflux until all acetone has reacted, as evidenced by a rise in the reaction temperature above the boiling point of acetone and discontinuing the heating before the temperature of the reaction mixture has risen to 100° C.

3. As a new composition of matter, a compound formed by heating together two mols of acetone and one mol of quinoline under reflux until all acetone has reacted, as evidenced by a rise in the reaction temperature above the boiling point of acetone to about 85° C., and thereafter discontinuing the heating to prevent the reaction mixture from exceeding 100° C.

4. As a new composition of matter, a compound formed by heating together two mols of acetone and one mol of quinoline under reflux until the reaction temperature rises above the boiling point of acetone not in excess of 100° C., and thereafter discontinuing the heating on evolution of water from the reaction mixture.

5. The method of controlling corrosion of metals exposed to the corrosive action of aqueous solutions containing dissolved acidic materials of the group consisting of carbon dioxide and water soluble organic acids which comprises introducing into the said aqueous solution a quantity, small but sufficient to substantially inhibit corrosion, of a product prepared by heating together two mols of acetone and one mol of quinoline at reflux temperature and discontinuing the heating when the temperature of the reaction mixture has risen to about 85° C., and thereafter causing the said product to come into contact with the metal to be protected.

6. The method according to claim 5 in which the product is prepared by heating together two mols of acetone and one mol of quinoline under reflux until all acetone has reacted, as evidenced by a rise in the reaction temperature above the boiling point of acetone and discontinuing the heating before the temperature of the reaction mixture has risen to 100° C.

7. The method according to claim 5 in which the product is prepared by heating together two mols of acetone and one mol of quinoline under reflux until the reaction temperature rises above the boiling point of acetone, and thereafter discontinuing the heating.

References Cited in the file of this patent

UNITED STATES PATENTS

| | | |
|---|---|---|
| 1,906,942 | Horst | May 2, 1933 |
| 2,472,400 | Bond et al. | June 7, 1949 |
| 2,493,462 | Menaul | Jan. 3, 1950 |

FOREIGN PATENTS

| | | |
|---|---|---|
| 588,864 | Great Britain | June 5, 1947 |